United States Patent [19]

Tregay

[11] 4,321,564
[45] Mar. 23, 1982

[54] SEQUENTIAL BEAM SWITCHING OF ACOUSTO-OPTIC MODULATOR

[75] Inventor: John L. Tregay, Smithtown, N.Y.

[73] Assignee: Litton Systems, Inc., Melville, N.Y.

[21] Appl. No.: 160,765

[22] Filed: Jun. 18, 1980

[51] Int. Cl.³ .......................... H01S 3/101; H04B 9/00
[52] U.S. Cl. .................................... 332/7.51; 350/358; 365/123
[58] Field of Search ........ 332/7.51; 350/358, DIG. 2; 365/64, 123

[56] References Cited

U.S. PATENT DOCUMENTS

| | | | |
|---|---|---|---|
| 3,727,062 | 4/1973 | Foster | 350/358 |
| 3,744,039 | 7/1973 | Hrbeh et al. | 365/123 |
| 3,759,603 | 9/1973 | Eschler | 350/358 |
| 3,900,851 | 8/1975 | Bucy et al. | 350/358 |
| 3,935,566 | 1/1976 | Snopko | 365/64 |
| 4,000,493 | 12/1976 | Spaulding et al. | 350/358 |
| 4,206,347 | 6/1980 | Avicola et al. | 350/358 |
| 4,269,482 | 5/1981 | Mori | 350/358 |

FOREIGN PATENT DOCUMENTS

| | | | |
|---|---|---|---|
| 54-5752 | 1/1979 | Japan | 350/358 |
| 54-139743 | 10/1979 | Japan | 350/355 |
| 252668 | 2/1970 | U.S.S.R. | 350/358 |

Primary Examiner—Nelson Moskowitz
Attorney, Agent, or Firm—Robert F. Rotella; Michael H. Wallach

[57] ABSTRACT

An acousto-optic modulator beam switching device for use in recording and display systems comprises a source of collimated light; an acousto-optic modulator; said source being capable of being beamed at said modulator; a radio-frequency oscillator capable of providing outputs at a plurality of frequencies; and a switching device coupled to said modulator and to said oscillator means; said switching device allowing each of said plurality of frequencies to be coupled to said modulator in succession, according to a predetermined sequence; the application to the modulator of each of said frequencies causing a corresponding deflection in the angle of the beam exiting from said modulator; said deflected beam having a predetermined power versus time characteristic; said predetermined sequence allowing a first frequency to be coupled to said modulator followed by a second frequency being coupled to said modulator at a time before the deflected beam exiting from said modulator, as a consequence of the application of said first frequency, has reached its maximum level of power.

10 Claims, 11 Drawing Figures

SEQUENTIAL BEAM SWITCHING OF ACOUSTO-OPTIC MODULATOR

BACKGROUND OF THE INVENTION

This invention is concerned with an improved method of providing a multiple-channel recording and display capability. There is a present and continuing need for higher and higher speed information recording and display systems. To this end, prior art systems have been developed which have achieved significantly higher speed recording and display systems by use of lasers and acousto-optic modulator cells. It was realized that the inherent speed limitations of raster scan recording systems could be circumvented by use of multiple scanning beams and several prior art systems involving lasers, acousto-optic modulator cells and multiple scanning beams have been described. For example, U.S. Pat. No. 3,744,039 presents a multiple-channel information translation system wherein many amplitude modulated radio-frequency carrier signals of different predetermined frequencies are simultaneously impressed on the acousto-optic cell to create a multiplicity of angularly spaced output beams from a single input laser beam. Additionally, it was shown that such a system could be used with the addition of appropriate electronic circuits such as character generators to provide a high speed alphanumeric line printer capability.

It was recognized that the basic system described in the patent could have some limitations in that random, signal-related spurious amplitude modulation of the primary output light beams could result from cross-channel interference effects in the acousto-optic cell. In U.S. Pat. No. 3,935,566, entitled "Multiple-Channel Information Translation System and Method", methods are described for the selection of the various carrier frequencies which would suppress the spurious amplitude modulation of the primary beams.

A multiple-beam scanning and recording system, presented in U.S. Pat. No. 4,000,493 entitled "Acousto-Optic Scanner Apparatus and Method", avoids these spurious modulation effects by reducing the carrier signal levels to such a value so as to minimize cross-channel interference effects. Unfortunately, the conversion efficiency of the acousto-optic cell at these low drive levels is also quite low and in many systems where laser power is already barely sufficient to meet the system requirements, could represent an intolerable loss.

Another prior art system is described in U.S. Pat. No. 3,900,851 entitled "Multi-Channel Wideband Oscillograph". In this system, each of the simultaneously applied carrier frequencies are frequency modulated to provide multiple, simultaneous oscillograph traces. This system has several disadvantages. First, it has been demonstrated experimentally that the conversion efficiency of an acousto-optic modulator cell decreases as the number of simultaneously applied carrier frequencies is increased. Second, intermodulation effects in the external electronic circuits and in the acousto-optic cell itself could create spurious oscillograph traces.

All of the prior art systems cited above feature simultaneous application of multiple modulated carrier frequencies to the acousto-optic cell to achieve multiple beam operation and consequently have the disadvantages of reduced conversion efficiencies and possible interference effects.

SUMMARY OF THE INVENTION

It is a novel feature of the present invention that simultaneous multiple-beam operation of a laser recording or display system is provided by sequential application of the various modulated carrier frequencies. In this way, the high conversion efficiencies appertaining to the use of a single drive frequency are achieved and there are no cross-channel interference effects as only a single carrier frequency is applied at a time. Simultaneous multiple-beam operation is achieved in two ways. First, the various carrier frequencies are represented as separate but contiguous regions in the acoustic wave that passes through the acousto-optic cell. As each of these regions pass through the acousto-optic cell, it will eventually interact with the entire incident laser beam to form an output beam at the angle corresponding to the frequency used. The carrier frequency repetition rate is sufficiently high so that successive beam deflections corresponding to a particular carrier frequency will have sufficient overlap in the horizontal (or scanning) direction to yield an essentially continuous scan line. Tilting of the recorded information produced by the interaction of the non-simultaneous beam deflections and the horizontal scanning motion is compensated for by an appropriate rotation of the acoustic axis of the acousto-optic cell. Another novel feature of the present invention is that the peak drive power requirement for the acousto-optic cell is much lower for sequential as compared to simultaneous application of the various carrier frequencies. In fact, the peak power for simultaneous operation is larger than that for sequential operation by a factor equal to the number of carrier frequencies used.

DETAILED DESCRIPTION OF THE INVENTION

Figure 1:
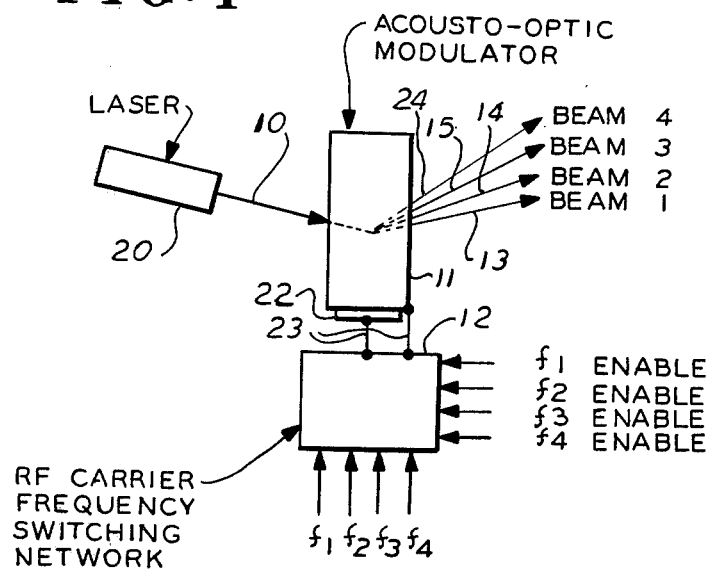
FIG. 1 is a diagrammatic view of a basic arrangement embodying the principles of the invention.

Referring now to FIG. 1, there is shown a beam deflection system comprising a source 20 of a collimated light beam 10, such as a laser, an acousto-optic modulator 11 disposed in the path of beam 10.

Acousto-optic modulators typically comprise a piece of optically transparent material which is capable of propagating traveling or standing ultrasonic waves which are established within the material by means of an associated transducer excited by a source of radio frequency energy such as an oscillator. A light beam incident on the acousto-optic modulator will emerge at an angle differing from the angle of incidence as a function of the frequency of the applied oscillator signal. In this manner the light beam emerging from the modulator may be deflected by suitable selection of the frequency of the applied oscillatory signal. Since acousto-optic modulators are now commercially available and their properties well-understood, no further discussion of their principle of operation will be undertaken here.

Electrically coupled to the transducer 22 of modulator 11 at 23 is a radio-frequency (RF) switching network 12. Network 12 is fed with a number of RF signals of various frequencies $f_1$, $f_2$, $f_3$, etc., which may be generated by corresponding individual oscillators or other well-known means. At a given time a particular frequency is enabled by activating one of the enabling lines and that frequency appears on input 23 to the modulator transducer 22. The enabling function may be performed electronically in any well-known manner, such as by a diode matrix and digital counter arrangement. Each applied RF signal to the modulator 11 causes the beam emerging from the modulator to have a particular angle of deflection relative to the angle of incidence (axis of beam 10).

Figure 2:
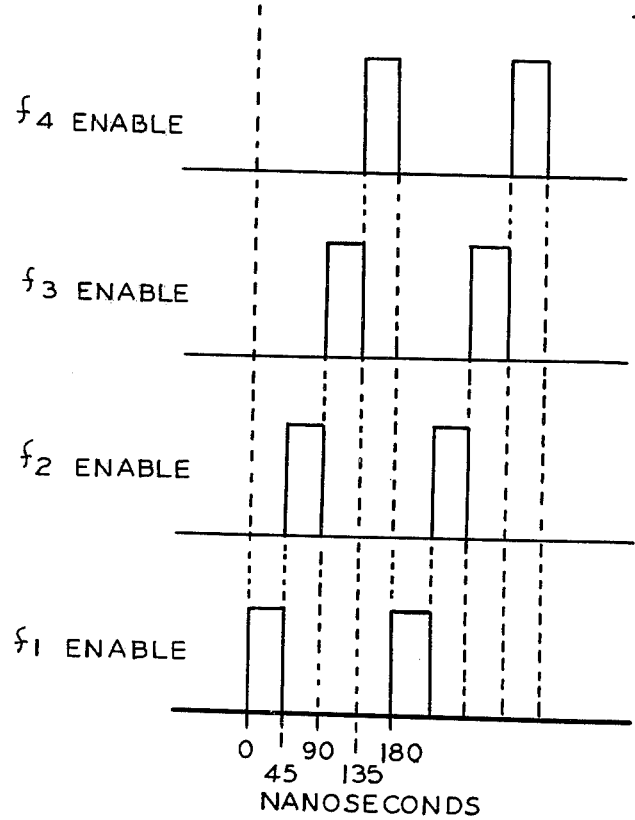
FIG. 2 is a graph showing the switching of radio frequency electrical signals in accordance with the invention.

Thus, a single light beam 10 from laser 20 is divided into a plurality of beams 13, 14, 15 by the sequential application by the switching network 12 of a plurality of radio-frequency (RF) carrier signals having frequencies, $f_1$, $f_2$, $f_3$, etc., to the acousto-optic modulator 11. Output beams 13, 14, and 15 as produced by carrier frequencies $f_1$, $f_2$, $f_3$, respectively, have angular separations proportional to the corresponding differences in the carrier frequencies. The RF carrier frequency switching network 12 is controlled by application of the various enabling signals as a function of time as shown in FIG. 2. As shown, only one RF carrier frequency is switched on at any instant of time.

Figure 3:
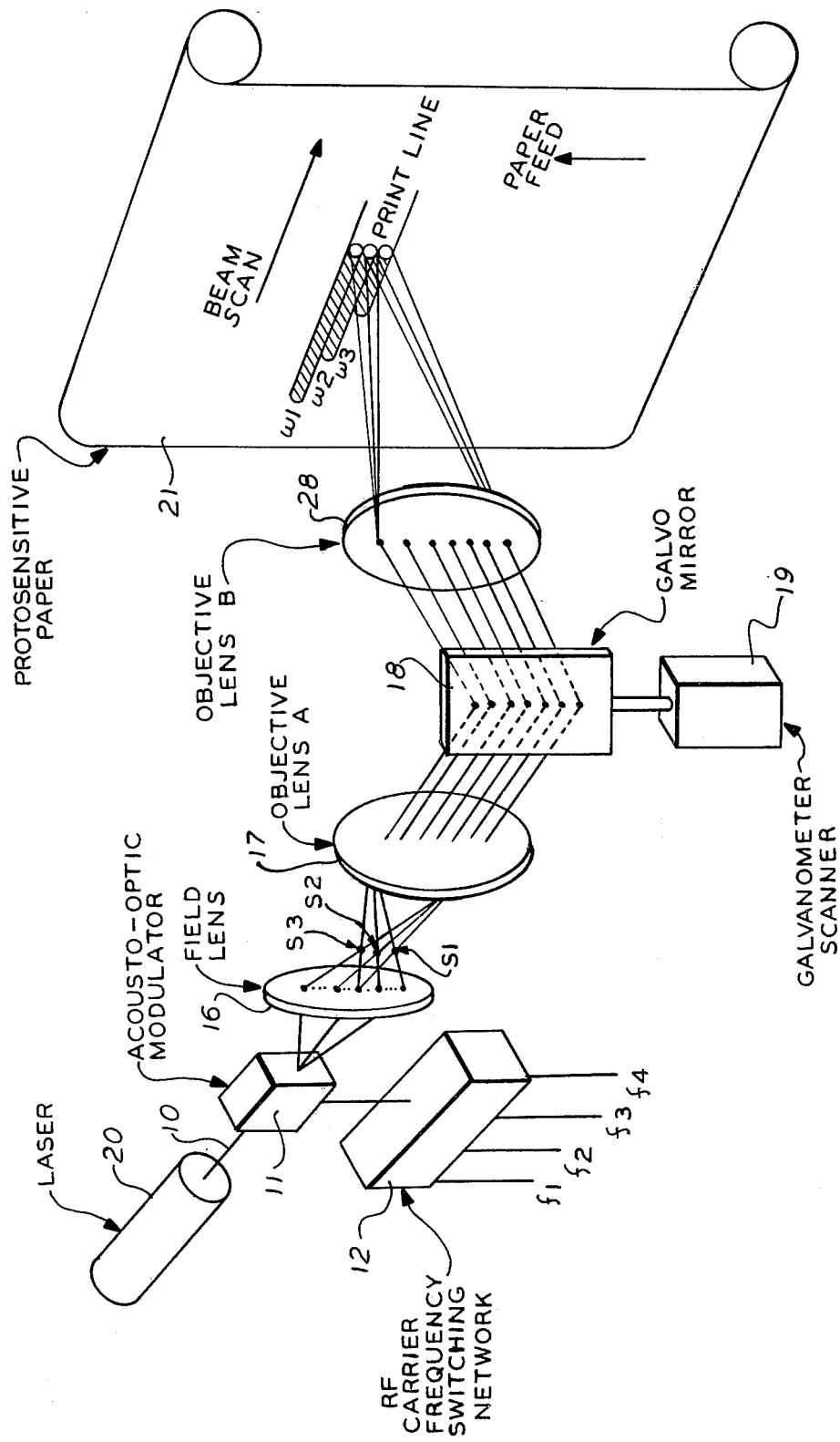
FIG. 3 is a diagrammatic view of the invention showing recording of light beams onto a record medium.

FIG. 3 shows an embodiment utilizing the principles of the present invention for facsimile recording at various degrees of vertical resolution. The laser beam 10 passes through the acousto-optic modulator 11, fed by selected RF frequencies, and, by virtue of the field lens 16, is focused into spot $S_1$ at the lens 16 focal point. Objective lens 17 collimates the divergent beam from spot $S_1$ which is then incident onto a galvanometer scanner mirror 18 or a rotating polygon having reflective faces. Mirror 18 is driven in a reciprocatory scanning manner by means of a mechanically coupled scanner mechanism 19. The collimated scanning beam reflected from scanning mirror 18 is focused by objective lens 20 onto a photosensitive medium 21, which may be, for example, photosensitive paper, to form a scanned print line having a width which is a function of the number of RF frequencies applied to modulator 11.

Thus, if frequency $f_1$ alone is applied, the scan line will have a width of $W_1$ and thus the highest degree of resolution. If both $f_1$ and $f_2$ are sequentially enabled, the print line width is doubled and has a combined width of $W_1$ and $W_2$. Similarly, a triple-width print line ($W_1$, $W_2$, and $W_3$) is achieved by sequentially selecting RF frequencies $f_1$, $f_2$, and $f_3$ by appropriate enabling of the switching network 12.

Figure 4:
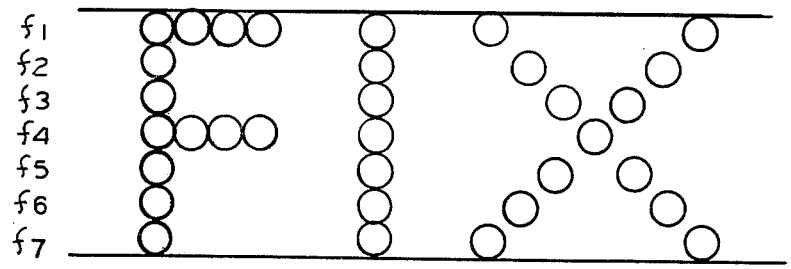
FIG. 4 is a representation of the formation of alphanumeric characters by switching of various radio frequency signals according to the invention.

By increasing the number of discrete carrier frequencies, the embodiment of FIG. 3 can be used as a high speed alphanumeric line printer. FIG. 4 shows how, for example, seven discrete carrier frequencies can be sequentially switched to form a 4×7 alphanumeric printing matrix. The verticality of the recorded symbols (as shown) is insured by appropriate rotation of the acousto-optic modulator around the optical axis (i.e., the light beam 10) to compensate for skew inherent in the optical scanning system.

Figure 5:
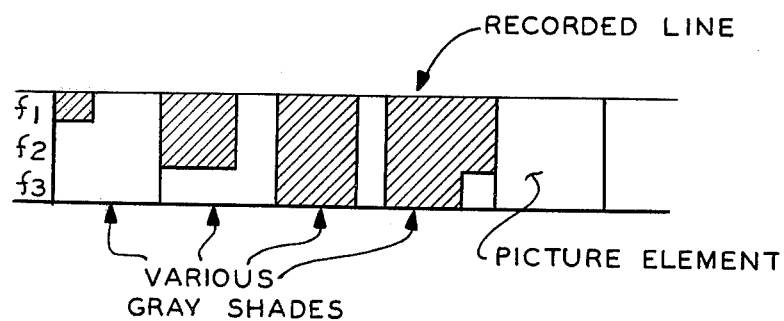
FIG. 5 is a diagram showing the production of grey shades by modulation of the radio frequency signals.

Individual modulation of the discrete carrier frequencies of the embodiment of FIG. 3 allows for the half tone production of grey shades as shown in FIG. 5. The ratio of black to white in each elemental area is controlled by choosing the number of frequencies selected as well as the time duration for each such frequency. In this application, the spots produced by the discrete carrier frequencies are preferably oblong in shape with a very narrow width. This optimum oblong shape can be achieved using crossed cylindrical lenses as described in copending patent application Ser. No. 974,575, filed Dec. 29, 1978, and assigned to the assignee of the present application.

When the sequential application of two or more RF carrier frequencies to the acousto-optic modulator is carried out at very high switching frequencies according to the principles of the present invention, an increase in the vertical size of the resulting recording spot is achieved. The vertical size is directly proportional to the switching frequency for all switching frequencies above a threshold value. This threshold value occurs when the period of the switching frequency times the acousto-velocity in the acousto-optic modulator is equal to the diameter of the laser beam. Thus, another feature according to the principles of the present invention is the achieving of an electronically controlled beam height, the desired beam height being achieved by the establishment of a particular switching frequency. This feature can be applied, in particular, to the production of grey shades by the half tone method. It can also be used for the achievement of various vertical recording resolutions.

Figure 6:
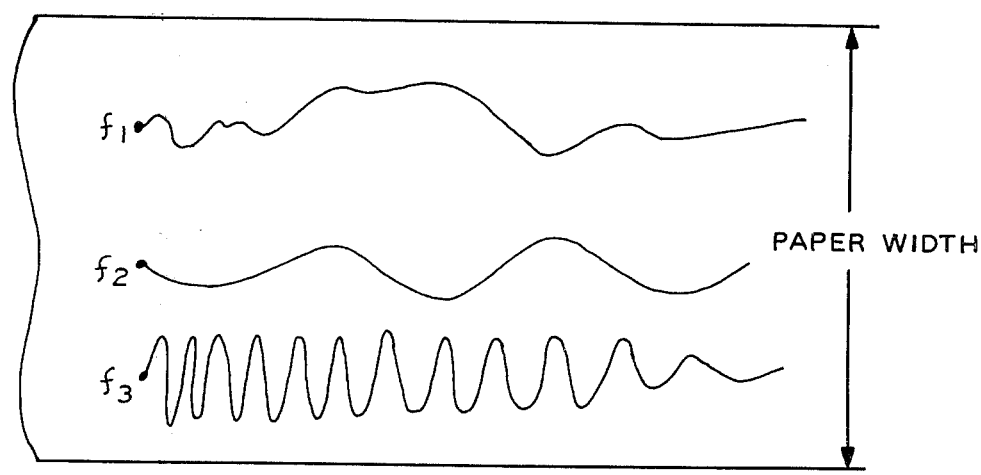
FIG. 6 is a graphical representation of oscillographic recording by means of the present invention.

The sequential application of multiple RF carrier frequencies to the acousto-optic modulator can also be used to achieve multi-channel wideband oscillograph operation as shown in FIG. 6. For oscillograph operation, each carrier frequency is produced, for example, by a voltage controlled oscillator (VCO). The multi-channel oscillograph information would be used to control the frequencies of the individual VCO's so as to impart a vertical displacement of the individual recording lines as shown in FIG. 6. The switching frequencies would be high enough so as to achieve an essentially continuous recording line for each trace.

Figure 7:
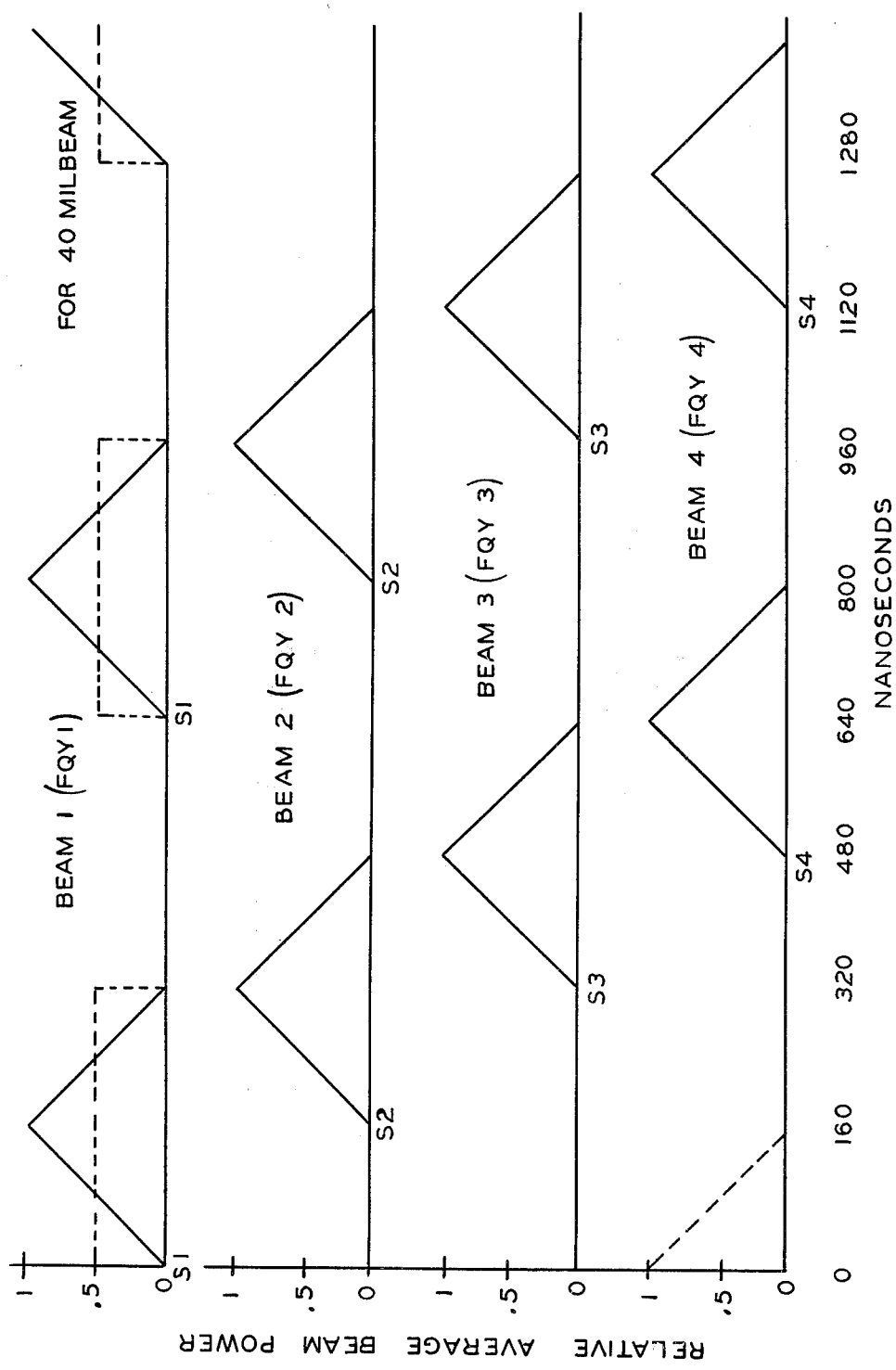
FIG. 7 is a graph showing the response characteristic of the acousto-optical modulator as a result of switching of the radio frequency signals at a first rate.

Referring now to FIG. 7, there is shown a graph of the relative response of an acousto-optic modulator in terms of average beam power as a function of time, given an impinging beam with a diameter of 40 mils. As is evident from inspection of the graph for beam 1, representing frequency $f_1$, for a 40 mil beam striking the modulator at zero time, the average beam power will reach its maximum relative value within approximately 160 nanoseconds (rise time) and then fall to zero value in another 160 nanoseconds (fall time) or 320 nanoseconds after zero time.

The remaining graphs for beams 2, 3, and 4, representing frequencies $f_2$, $f_3$, and $f_4$, respectively, show the acousto-optic modulator response where the individual beams are switched on at successive 160 ns intervals and left on for a 160 ns period. The switching cycle is repeated at 640 ns when beam 1 is switched on. Note that, at that time, beam 4 has reached its maximum relative value. It would thus appear that the highest switching speed that could be expected with a 40 mil diameter beam when switching between four beam spot locations would be on the order of 160 nanoseconds.

Figure 8:
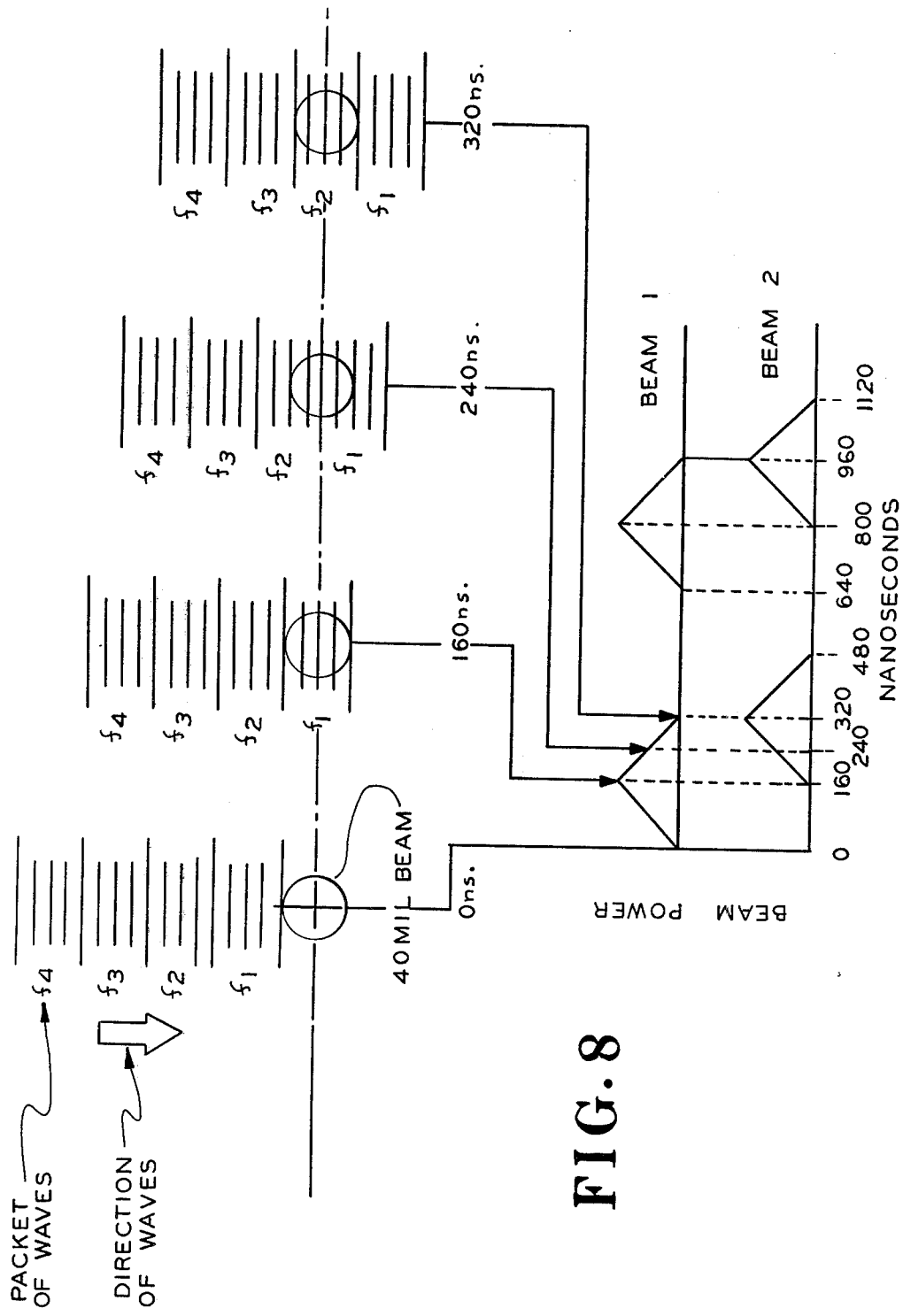
FIG. 8 is a diagram showing the progression of a light beam in response to the switching of the radio frequency signals at said first rate.

Turning now to FIG. 8, there is shown a graph of the propagation of a 40 mil diameter light beam through an acousto-optic modulator in response to sequential beam switching such as shown in FIG. 7. Although only two beams are shown it is to be understood that the power cycle for beams 3 and 4 are as shown in the previous figure. In the representation of FIG. 8, the beam is depicted as, for convenience, emerging from the plane of the sheet of drawing.

As frequency $f_1$ is applied to the acousto-optic modulator an acoustic wave is established in the modulator propagating medium which acts as a deflection grating as it passes across the beam. The frequency applied governs the amount of deflection so that switching to frequency $f_2$ creates a separate beam spot location. The velocity of the acoustic wave through the propagating medium determines the rise and fall time of the power wave in each of the, say, four spots corresponding to frequencies $f_1$, $f_2$, $f_3$, and $f_4$. The full power of the light beam is applied to the imaging medium but it is on only one fourth of the time in each spot.

Figure 9:
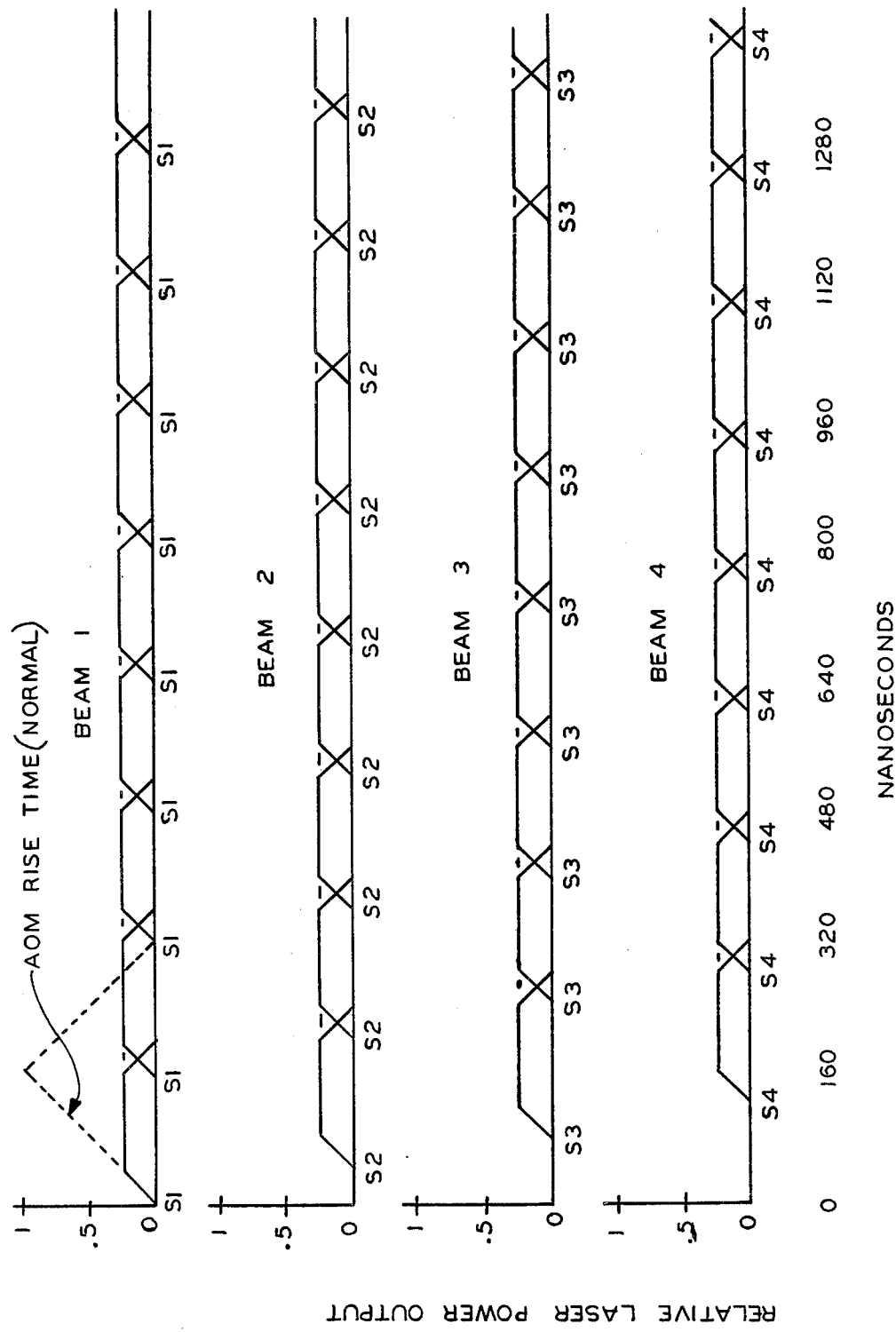
FIG. 9 is a graph of the beam imaging power at a second, faster switching rate than the rate shown in FIGS. 7 and 8.

FIG. 9 is a graph showing the power output response of the acousto-optic modulator versus time, where switching of the various frequencies is accomplished according to the principles of the invention. Instead of allowing each frequency to be "on" for a period of time to permit the maximum power output level to be reached, the frequency "on" time is substantially reduced along with the power level achieved. In addition, however, the switching rate is increased so that the individual frequencies are switched on at a greater rate.

For example, frequency $f_1$ is switched on at time zero and the power level begins to rise (in conformance with the slope of the rise time characteristic). At the time the power level of the light beam reaches an intensity of about one-quarter maximum relative level, frequency $f_1$ is switched off and frequency $f_2$ is switched on and the power curve for its associated beam begins to rise as well. When the second beam reaches the quarter maximum level, frequency $f_2$ is switched off and frequency $f_3$ is switched on, followed by switching on of frequency $f_4$ and switching off of frequency $f_3$.

Figure 10:
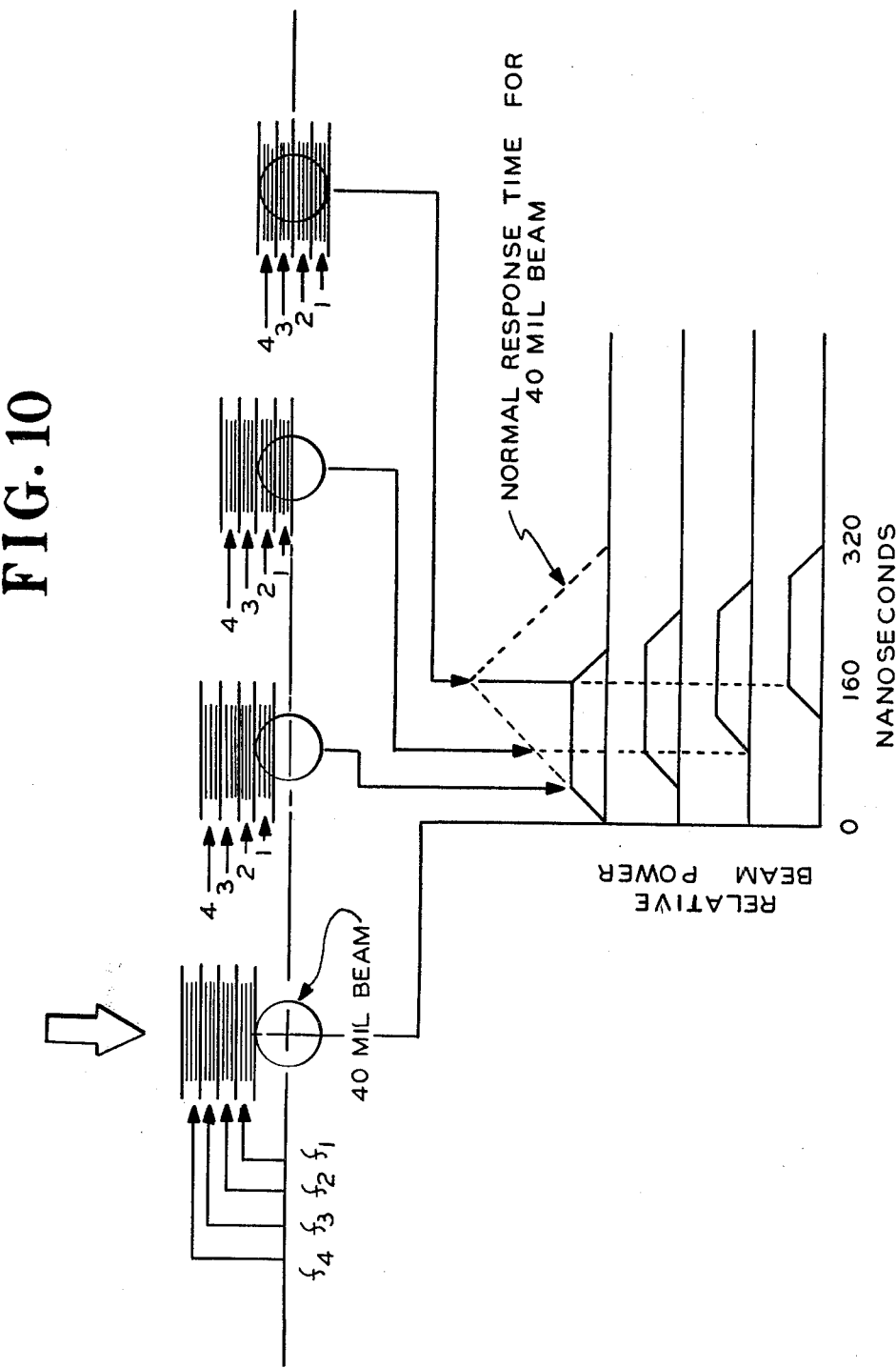
FIG. 10 is a graph of the beam imaging power at said second, faster switching rate.

The power level for beam 1 remains high even after frequency $f_1$ is switched off because the acoustic wave established by frequency $f_1$ is still being traversed by the 40 mil laser beam as shown in FIG. 10. The beam power output for the $f_1$ frequency scan only begins to decrease as the 40 mil laser beam starts to leave the acoustic wave zone established by frequency $f_1$ at an elapsed time of 160 nanoseconds. However, as may be seen from FIG. 9, by the time that the beam power would otherwise start diminishing, all of the other frequencies $f_2$, $f_3$, $f_4$ have been successively applied to the AOM and the cycle commences again with the application of frequency $f_1$. In effect, then, the power level for each of the deflected beams remains at a constant value, as shown in the graph.

Again, the 40 mil beam diameter and switching rates shown in FIGS. 9 and 10 have been chosen for exemplary purposes only and it should not be construed that the principles of the invention are limited to solely these values.

It can thus be seen from FIGS. 9 and 10, that the ability to apply a plurality of carrier frequencies to an AOM and to cause corresponding deflections of the AOM output light beam has, by the principles of the present invention, been significantly enhanced in terms of the higher speed at which such plurality of frequencies can be individually and successively applied and the resulting faster deflection of the output light beam. Where the present inventive technique is applied to a scanning and/or recording system it can be readily seen that faster deflection of the scanning and recording beams is readily achievable and, as a result, faster system performance is obtained.

The beam power outputs shown do not take into account the circularly symmetric Gaussian characteristic of the finite diameter laser beam to avoid obscuring the principles of the present invention. When this characteristic is considered, the sloping straight lines of the beam power outputs would be transformed into curved lines, concave upwards, and the horizontal straight lines into curved lines, concave downwards. In other respects, however, the operation of the inventive system is as has been described above.

Figure 11:
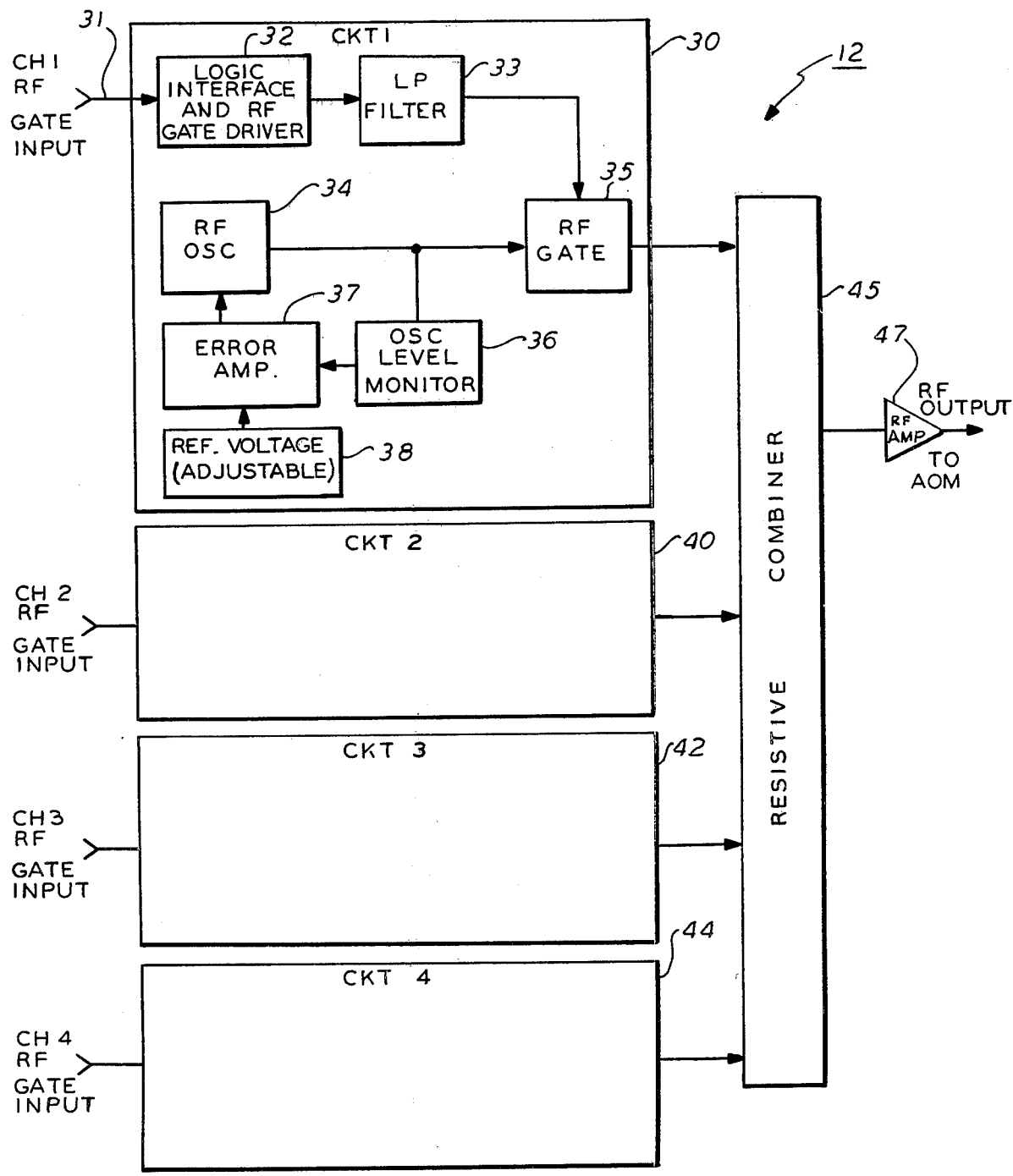
FIG. 11 is a block diagram schematic of the circuit utilized to generate and feed the radio frequency signals to the acousto-optic modulator.

Referring now to FIG. 11, there is shown an embodiment of a radio-frequency carrier switching network 12 suitable for use in the systems disclosed in FIGS. 1 and 3. The network 12 consists of a plurality of identical gating circuits 30, 40, 42, 44, each corresponding to an individual, discrete frequency which is desired to be applied to the AOM. Obviously, if a greater or lesser number of frequencies is desired, the number of gating circuits is correspondingly increased or reduced.

Each gating circuit 30, 40, 42, 44 is comprised of a logic interface and radio-frequency driver circuit 32 to which is fed a gate input signal 31. The gate input signal 31 may be derived from any suitable switching circuit which governs the rate at which the various inputs 31 are gated "on" and the time duration of each such "on" gating. The gate input signals are applied to a logic interface and RF gate driving circuit 32 which is adapted to match the type of logic used for the gate input signals, say TTL, and the requirements of the RF gate circuit 35 which may be, say, a power RF transistor switch circuit. A low pass filter 33 is interposed between driver 32 and gate 35 to filter out any undesirable harmonies which would tend to drive the RF gate 35 at a faster rate than is desired.

The RF gate 35 is fed with an RF oscillator 34 to which is coupled a conventional feedback loop consisting of an oscillator level monitor 36, reference voltage source 38 and error amplifier 37. If desired, the oscillator 34 and associated feedback loop functions may be provided by a suitable phase-locked loop integrated circuit.

The output lines of each of the gates 35 are connected to a resistive combiner network 45 and thence, through a radio-frequency amplifier 47, which raises the level of the RF signal to the required level, to the acousto-optic modulator.

Clearly, other modifications and variations of the present invention will become apparent to those skilled in the art; thus, the present invention should be limited only by the appended claims.

I claim:

1. An acousto-optic modulator beam switching device for use in recording and display systems comprising:
a source of collimated light;
an acousto-optic modulator;
said source being capable of being beamed at said modulator;
radio-frequency oscillator means capable of providing outputs at a plurality of frequencies; and
switching means coupled to said modulator and to said oscillator means;
said switching means allowing each of said plurality of frequencies to be coupled to said modulator in succession, according to a predetermined sequence;
the application to the modulator of each of said frequencies causing a corresponding deflection in the angle of the beam exiting from said modulator;
said deflected beam having a predetermined power versus time characteristic;
said predetermined sequence allowing a first frequency to be coupled to said modulator followed by a second frequency being coupled to said modulator at a time before the deflected beam exiting from said modulator, as a consequence of the application of said first frequency, has reached its maximum level of power.

2. An acousto-optic modulator beam switching system, as set forth in claim 1, wherein:
said switching means removes said first frequency from said modulator after a predetermined interval of time, followed by successive removal of the remaining plurality of applied frequencies at correspondingly later times.

3. An acousto-optic modulator beam switching system, as set forth in claim 2, wherein:
the cycle of application and removal of each frequency is such that the power level in the deflected beam associated with each frequency remains constant.

4. An acousto-optic modulator beam switching system, as set forth in claim 2, wherein:
said plurality of frequencies is n in number;
the deflected beam associated with the nth frequency reading its maximum power level at the same time the deflected beam associated with the first frequency begins to drop in its power level.

5. An acousto-optic modulator beam switching system, as set forth in claim 4, wherein:
said first frequency is again applied to said modulator at the instant that the deflected beam associated with said first frequency begins to drop in its power level.

6. An acousto-optic modulator beam switching system, as set forth in claim 2, wherein:
said plurality of frequencies are applied to said modulator such that areas of acoustic standing waves are established in said modulator;
each of said areas being associated with a particular applied frequency.

7. An acousto-optic modulator beam switching system, as set forth in claim 6, wherein:
at least a pair of adjacent areas are established corresponding to successively applied first and second frequencies.

8. An acousto-optic modulator beam switching system, as set forth in claim 1, further comprising:
scanning means; and
a movable record medium;
said scanning means being adapted to direct said deflected beams onto said record medium.

9. An acousto-optic modulator beam switching system, as set forth in claim 8, wherein:
said scanning means comprises a reflective surface.

10. An acousto-optic modulator beam switching system, as set forth in claim 9, wherein:
said scanning means comprises a reciprocatory galvanometer for directing said deflected beams in a direction which is essentially perpendicular to the relative direction of motion of said record medium.

* * * * *